Nov. 11, 1952  M. L. JEFFREY  2,617,951
SOLENOID OPERATED OSCILLATING DEVICE
Filed May 10, 1949                                                2 SHEETS—SHEET 1
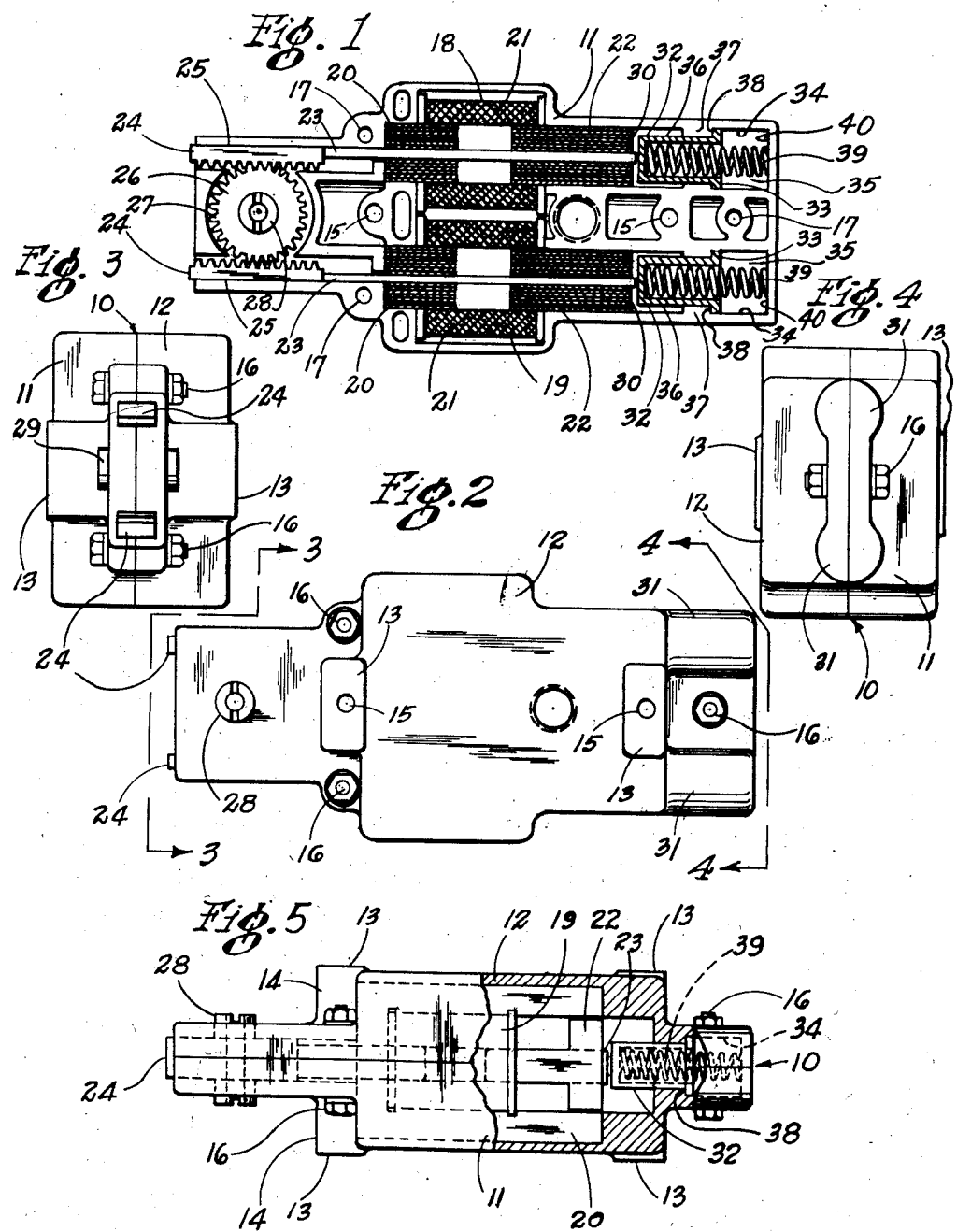
INVENTOR.
MAX L. JEFFREY
BY
J. S. Douglas
HIS ATTORNEY Nov. 11, 1952     M. L. JEFFREY     2,617,951
SOLENOID OPERATED OSCILLATING DEVICE
Filed May 10, 1949                 2 SHEETS—SHEET 2
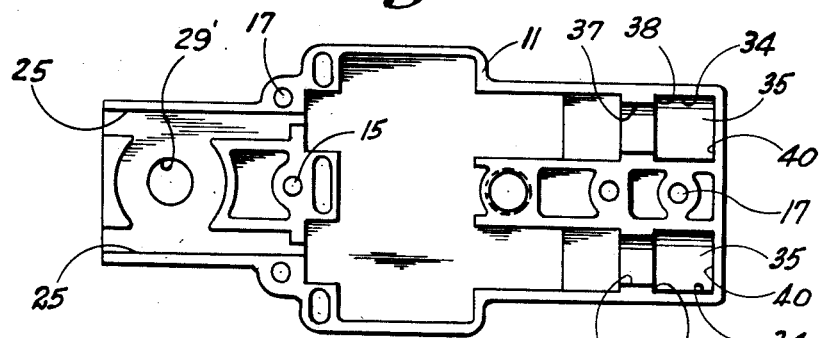
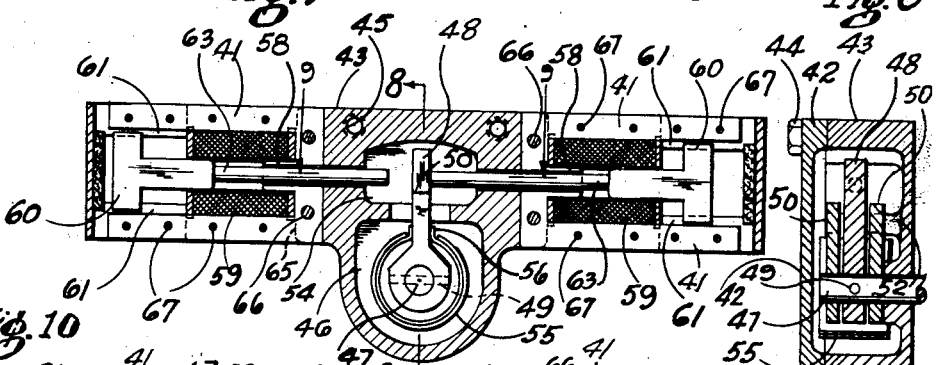
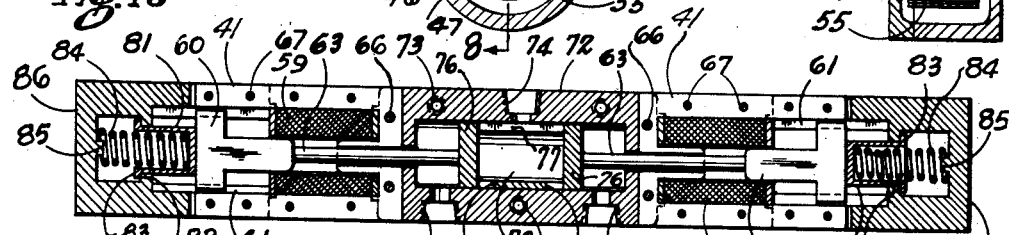
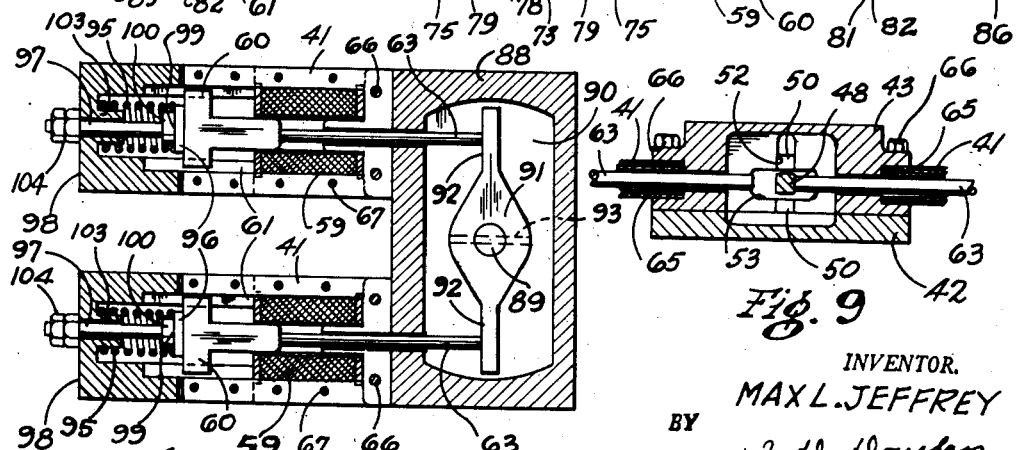
INVENTOR.
MAX L. JEFFREY
BY
J. D. Douglass
HIS ATTORNEY Patented Nov. 11, 1952

2,617,951

UNITED STATES PATENT OFFICE 2,617,951

SOLENOID OPERATED OSCILLATING DEVICE

Max L. Jeffrey, Hunting Valley, Ohio, assignor to The National Acme Company, Cleveland, Ohio, a company of Ohio Application May 10, 1949, Serial No. 92,296

1 Claim. (Cl. 310—35)

This invention relates to apparatus for producing oscillating motion, and more particularly to an apparatus powered by a pair of electric solenoids alternately energized to provide a longer stroke of the solenoid and, therefore, a more useful motion, or a greater force on a shorter motion than has been possible with prior devices.

In the past, there have been many small devices for producing oscillatory motion. Many of these converted the rotary motion of a motor to an oscillating motion by means of a crank; some utilized power other than electric power in the manner of an engine as, for instance, the common windshield wiper which operates from the vacuum of the intake manifold of an internal combustion engine. Each of these has distinct disadvantages. The conversion of rotary motion requires a separate transmission including the crank and possibly gears to slow down the motion. The vacuum engine will not operate unless the vacuum is sufficiently great and except when used in an automobile or the like, the source of vacuum is not readily available.

There have also been proposed solenoid operated devices, but these have all partaken of the basic weakness of the solenoid, namely, its relatively short stroke. My invention reduces, to a great degree, this weakness. By my invention I double the length of stroke of the ordinary solenoid and thus make possible the use of larger leverage or gear means for a given stroke with the consequent gain in mechanical advantage. This gain is accomplished by the use of two solenoids, so interoperative that the energization of one forces the armature of the second completely beyond the usual neutral withdrawn position. A spring then forces the armature back to its conventional neutral position from whence it can be drawn into its stator, thus forcing the first armature out beyond the windings. Thus it can be seen the stroke of the armature is, in effect, doubled.

Still other advantages of my invention, and the invention itself will become apparent from the following detailed description of some embodiments thereof which are illustrated by the drawings and which form a part of this specification.

In the drawings:

Fig. 1 is a view of my device partly in section with the top of the housing removed;

Fig. 2 is a top plan view of my device completely assembled;

Fig. 3 is an end view from line 3—3 of Fig. 2;

Fig. 4 is a view from line 4—4 of Fig. 2;

Fig. 5 is a side elevational view of the assembled device with a portion of the housing broken away;

Fig. 6 is a view of one half of the housing for my device;

Fig. 7 is a medial sectional view of an alternative embodiment;

Fig. 8 is a sectional view along line 8—8 of Fig. 7;

Fig. 9 is a partial sectional view along line 9—9 of Fig. 7;

Fig. 10 is a view similar to Fig. 7 of another alternative embodiment of my invention; and Fig. 11 is a view similar to Fig. 7 of a third alternative embodiment of my invention.

Briefly, my invention comprises an apparatus designed to increase the usefulness of a solenoid. It is very useful for the rotary oscillation of a shaft, which motion may be desired for use in an automobile windshield wiper or fruit juice extractors or similar articles. This motion is accomplished by use of a pair of solenoids connected together and to a shaft so that when one solenoid is energized the armature of the other is forced completely out of its winding against a spring which urges it back to its neutral position upon de-energization of the first solenoid. The straight line movement of the armature is converted to rotary motion in the shaft by any convenient means. This action is alternated between the two solenoids so that a rotary oscillatory motion of the shaft results. However, my device is not limited to the rotary motion, for I can use the straight line movement directly without conversion if desired.

More specifically, and referring to the drawings throughout which like parts are designated by like reference characters, I provide a housing 10 which is composed of two parts, a bottom half 11 and top half 12. These two parts, which are substantially identical, may be irregular shaped castings (Fig. 6) provided with suitable mounting pads 13, formed on bosses 14, in which holes 15 may be drilled through or tapped to receive bolts for mounting the device in the machine for which it may provide power. The two pieces may be held together by bolts 16 extending through holes 17 provided in convenient locations on the housing.

In my preferred embodiment, I provide a pair of solenoids 18 and 19 mounted side by side in the housing. Each solenoid comprises the customary stator 20 with its winding 21 thereabout, and an armature 22 slidably disposed therein. Each of the armatures is provided with a rod 23 extending through the base of the stator 20 and engaging the end of a rack 24. The racks are slidably journalled in the housing 10 as shown at 25. A pinion 26, which is formed with the customary gear teeth 27, is engaged by the two racks 24 on opposite sides so that movement of one rack in one direction results in movement of the other rack in the opposite direction. The pinion may be formed with suitable coupling means 28 on either or both ends of its shaft 29 which is rotatably journalled in an opening 29' in the housing 10. It will be recognized that the rack and pinion arrangement may be replaced by a crank and connecting rod arrangement or any other means of converting straight line reciprocating motion to circular motion without departing from the scope of my invention. It is also conceived that the solenoids need not be mounted adjacent each other, but, in fact, might be at any angle or even directly opposed to each other as hereinafter described so long as the motion of one armature in any direction resulted in the motion of the other armature of the solenoid in an opposite direction relative to its stator.

In the normal or neutral position of the armatures 22, as shown in Fig. 1, the racks 24 engage the pinion 26 near their mid point. At this point, the armatures are engaged at their head end 30 by spring loaded stops, which are identical for each armature. These stops are mounted in bosses 31 in the housing 10, and each comprises a cup shaped plunger 32 having a flange 33 formed around its rim. This plunger is slidably disposed in the hollow boss 31 having its flange slidably journalled on the walls 34 of the cylindrical chamber 35. The body portion 36 of the plunger is journalled in a necked down portion 37 which provides a shoulder 38 for engagement with the flange 33 of the plunger. A spring 39 is engaged between the plunger 32 and the end wall 40 of the housing 10 to urge the plunger 32 toward its normal position in engagement with the head 30 of the armature and with the flange 33 engaging the shoulder 38.

In operation, the solenoids are energized alternately by a switch means not shown. As a solenoid is energized, its armature 22 is drawn into the wound portion or stator 20. This causes the rod 23 and the rack 24 to be moved to the left as viewed in Fig. 1. As the result of this movement, the pinion 26 is rotated, and the other rack is forced to the right, pushing the head 30 of its armature 22 against the plunger 32, and compressing the spring 39. As the armature nears the end of its stroke, the solenoid is de-energized, and the compressed spring forces the parts back to a neutral position. However, by the time the parts have reached the neutral position, the other solenoid has been energized and the movement is reversed. Thus it can be seen that each armature travels a distance out of its armature equal to the distance into the armature, and that the stroke of the solenoid is, therefore, effectively doubled.

An alternative embodiment utilizing the directly opposed solenoids mentioned above is shown in Figs. 7 and 8. In this device, the laminations of the stators 41 may provide a part of the outer walls. The housing, then, is in the form of cover plates at these sections. Near the center and at the end of the device, it is necessary to provide top and bottom and end walls. The front cover 42 (Fig. 8) may be made flat and be truly a cover held to the rear portion 43 of the housing by cap screws 44 threaded into tapped holes 45 in the rear housing 43.

The center portion of this housing is formed with a lower chamber 46 which contains a shaft 47 journalled therein. An operating lever 48 is fixed on the shaft 47 by a pin 49. Stationary arms 50 are journalled on the shaft 47 on either side of the operating lever 48 and are held stationary by their engagement in slots 52 in the housing. Between these arms, the lever 48 extends through an opening 53 into an upper chamber 54. A flat C shaped spring 55 surrounds the shaft 47 at the ends of the arms 50 and lever 48. This spring is similar to that used in connection with the switch shown in my Patent No. 2,270,951, issued January 27, 1942. The ends 56 of the spring engage the sides of the arms 50 and the operating lever 48. It is apparent that after any displacement, the operating lever 48 will be returned to its central position by the spring. Therefore, it can be seen that this arrangement merely serves to bring the device back to a neutral position after it has been moved out, similar to the arrangement of springs and plungers in the previously described embodiment.

The solenoids of this embodiment are arranged in a straight line opposed relationship rather than the side by side arrangement previously described. Each solenoid is similar to those previously described comprising a stator 41 of generally E-shaped formation, whose central leg 58 is surrounded by a winding 59, and an armature 60 which is slidably journalled in guides 61 formed in the outer portions of the legs of the stators. Rods 63 are fixed in the armatures 60 and extend through the stators 41 and, in the neutral position, abut the operating lever 48. The stators 41 are held in place in grooves 65 in the housing 43 by screws 66, and the laminations thereof may be held together by rivets 67. Leather or fiber buffer pads 68 are provided on the end wall 69 to prevent damage to the armature laminations when the armature is forced out of its winding by the energization of the opposite solenoid.

The operation of this embodiment may be similar to that of the preferred embodiment as will be recognized, or, as is apparent, the device could be used to select either of three alternate positions of a switch, valve, or the like.

A second alternative embodiment using the same solenoids as in the prior embodiment is shown in Fig. 10. These solenoids are arranged in opposed relationship as before and are designated by the same reference characters since they are similar in all respects to those just described. In this embodiment, the housing 72 is shown enclosing a valve having a neutral or "off" position and two alternate "on" positions. Tapped holes 73 are provided for screws adapted to hold on a cover not shown. A single inlet port 74 is drilled into one side of the housing and two outlet ports 75 in the other. A sliding valve member 76 is journalled in the body of the housing to select the route of the fluid being controlled by the valve. To that end, one side of the valve member 76 is formed with a large slotted opening 77 into a central chamber 78. Two alternate outlets 79 are provided, adapted to register with the outlet ports 75 when the member 76 is moved completely to one side or the other.

The rods 63 of the solenoid abut the ends of the member 76 and are thus adapted to slide the member one way or the other, depending on which of the solenoids is energized. In this embodiment, the solenoids are held in a neutral position by an arrangement similar to that of the first described device. Cup shaped plungers 81 are slidably journalled in walls 82 of the housing and are provided with flanges 83 which serve as stops. These plungers are urged by springs 84 into engagement with the armature 60 and serve to center the armatures when neither solenoid is energized. Spring guides 85 may be formed on the housing 72 to center the springs 84 properly on the end walls 86 of the housing.

Still another embodiment of my invention is shown in Fig. 11. In this embodiment, the solenoids of the embodiments shown in Figs. 7 and 10 are mounted side by side to operate an oscillating shaft. Adjustable stops for centering the device are provided in this embodiment.

More specifically, a housing 88 is provided having a central chamber. A shaft 89 is journalled in the back wall 90 of the chamber. An operating lever 91 having a pair of abutment surfaces 92, one on each side of the shaft, is fixed to the shaft 90 by a pin 93. The solenoid stators 41 are mounted in the housing in the same manner as in the two prior described embodiments by screws 66 extending through the stator. The push rods 63 of the solenoids abut the surface 92 of the lever 91 and are, therefore, operative to rock the lever upon energization of either solenoid.

The centering springs 95 are mounted somewhat differently in this embodiment. Stops 96 are provided having rods 97 extending through and journalled in the end walls 98 of the housing. Each of the stops has a spring seating surface 99 and a centering post 100 about which the spring 93 is disposed. The other end of the spring 95 is centered on a post 103 on the end wall 98 and abuts the end wall. Thus the stops are urged away from the end wall 98 by the springs. However, this force is resisted by a pair of jam nuts 104 threaded on each rod 97. These nuts are adjustable and, therefore, the position of the stop 96 may be adjusted somewhat to adjust the neutral position of the shaft 91 on the solenoid armatures 60.

The operation of this device is similar to that of my preferred embodiment. The solenoids are energized alternately to provide an oscillatory motion for the lever 91 and, therefore, for the shaft 89, the springs 95 and stops 90 serving to return the parts to the neutral position after each stroke.

Having thus described my invention, I am aware that numerous and extensive departures may be made therefrom without departing from the spirit or scope therefor.

I claim:

An apparatus of the class described comprising a housing, a pair of solenoids mounted in said housing adapted to be energized alternately, each including a stationary wound portion and a movable armature slidably disposed therein, a stop member slidably disposed in said housing for abutting engagement with each of said armatures, flange means on said stop members for engagement with shoulder means on said housing to limit the travel of said stop members toward said armatures, compression spring means engaged between said stop members and said housing urging said stop members toward said armatures, said stop members being limited in their travel to a position such that said armatures are yieldably held in a neutral position almost entirely withdrawn from said wound portions, and means linking said armatures adapted to force one of said armatures outward against the urging of said spring means when the other of said armatures is drawn into its wound portion.

MAX L. JEFFREY.

REFERENCES CITED

The following references are of record in the file of this patent:

UNITED STATES PATENTS

| Number | Name | Date |
|---|---|---|
| 431,493 | Van Depoele | July 1, 1890 |
| 615,418 | Wilkinson | Dec. 6, 1898 |
| 734,387 | Woodworth | July 21, 1903 |
| 1,126,084 | Reisbach | Jan. 26, 1915 |
| 1,150,169 | Bryant | Aug. 17, 1915 |
| 1,568,210 | Colstad | Jan. 5, 1926 |
| 1,619,677 | Pierce | Mar. 1, 1927 |
| 1,765,768 | Miller et al. | June 24, 1930 |
| 1,793,858 | Lake | Feb. 24, 1931 |
| 1,886,040 | Moodyman | Nov. 1, 1932 |
| 2,043,331 | Notvest | June 9, 1936 |
| 2,296,554 | Hinchman | Sept. 22, 1942 |

OTHER REFERENCES

"Solenoids, Electromagnets and Electromagnetic Windings," by Underwood, 1910, Van Nostrand Co., N. Y., pp. 110–130, particularly pp. 110, 111, 113–119.